May 21, 1968 M. W. NORELL 3,384,457
IONIZATION DETECTOR AND SAMPLING SYSTEM
Filed Dec. 4, 1963 2 Sheets-Sheet 1

INVENTOR.
MARK W. NORELL
BY
ATTYS.

INVENTOR.
MARK W. NORELL ent Office 3,384,457
Patented May 21, 1968

3,384,457
IONIZATION DETECTOR AND
SAMPLING SYSTEM
Mark W. Norell, Chicago, Ill., assignor to General American Transportation Corporation, Chicago, Ill., a corporation of Illinois
Filed Dec. 4, 1963, Ser. No. 328,011
11 Claims. (Cl. 23—254)

ABSTRACT OF THE DISCLOSURE

There is disclosed a hydrogen flame ionization detector and a sampling system therefor useful in continuously sampling gases or aerosols containing particles less than 10 microns in diameter, and wherein the samples are in minute volumes on the order of 1 to 5 cc. per minute, and wherein the samples contain only micrograms of organic materials or other solids per liter of gas; the detector and sampling system operate at subatmospheric pressure of a few inches of water to provide a more constant supply of hydrogen gas and air to the flame in the detector and a more constant flow of sample thereto so as to provide a minimum noise signal thus utilizing the maximum sensitivity of the detector; a heater is provided to maintain the temperature of the combustion chamber at a constant value; the gas sample to be measured is directly introduced into the combustion chamber without the use of a purge gas and all of the operative components of the vacuum system are connected between the flame ionization chamber and the vacuum pump, the vacuum system including connected in series from the outlet of the ionization chamber to the vacuum pump a condensing chamber of large volume, an isolation or ballast tank of large volume, a flow meter, a low vacuum chamber provided with a constant supply of pressure regulating air under the control of a precision vacuum regulator, a capillary tube and a high vacuum chamber having the outlet connected to a high vacuum pump.

---

Figure 1:
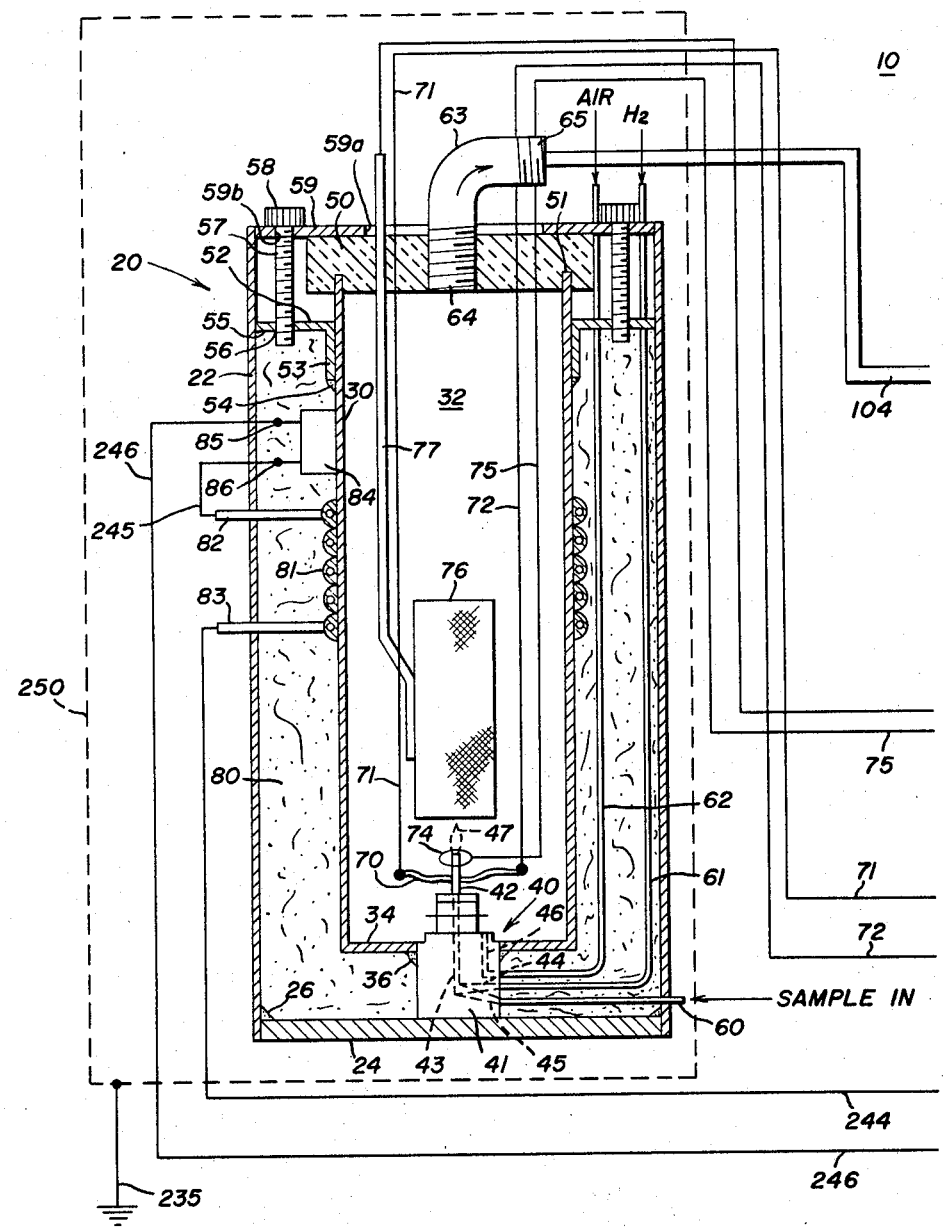

The present invention relates to ionization detector systems, and particularly to improved ionization detectors and improved sampling systems for use therewith.

The improved ionization detector of the present invention is of the flame ionization type utilizing specifically an hydrogen flame burning in air or oxygen to produce ionization; although the sampling system and method of the present invention will be described and ilustrated in conjunction with the improved hydrogen flame ionization detector of the present invention, it is to be understood that the sampling system and method of the present invention can be readily used with other types of ionization detectors and with other types of systems wherein it is desired to obtain continuous sampling of gases at predetermined pressures and flow rates. The improved hydrogen flame ionization detector and the improved sampling system of the present invention cooperate to provide an improved ionization detector system for measuring very small quantities of organic materials dispersed in inorganic gases, the organic materials being present in the form of gases, entrained liquids or entrained solid particles, or other suspended form generally classified under the term aerosol.

The flame detectors and sampling systems therefor that have been used heretofore in the art are operated under positive pressure, i.e., the sample is introduced thereinto under pressure, and in most structures the sample is further carried thorough the detector using a purge gas. Although such prior systems are generally suitable for their intended use, the systems require relatively long periods of time to reach equilibrium and it has been found difficult to maintain a precise pressure drop across the detector, variations in pressure within the detector generating interference and background noise thus limiting the sensitivity of the detector and of the overall system. Such prior art detector systems also have been limited in the character of the gas samples that can be detected and measured therein, particular difficulty being encountered when detecting and measuring high molecular weight organic compounds, and particularly when very low concentrations of such organic materials are to be continuously sampled and measured.

Accordingly, it is an important object of the present invention to provide an improved ionization detector system which is constructed and arranged for operation under subatmospheric conditions therein.

In connection with the foregoing object, another object of the invention is to provide an improved ionization detector system into which the gas sample to be measured is directly introduced and in which no purge gas need be employed.

Another object of the invention is to provide an improved ionization detector system of the type set forth which quickly reaches equilibrium whereby the system may be used continuously to measure samples that vary substantially in composition.

Another object of the invention is to provide an improved hydrogen flame ionization detector particularly constructed and arranged to operate with a subatmospheric pressure therein, the pressure being carefully maintained at a predetermined value to minimize the generation of noise and thus increasing the sensitivity of the detector.

Yet another object of the invention is to provide an improved hydrogen flame ionization detector of the type set forth including an improved combustion chamber provided with a heating structure independent of the hydrogen burner therein for maintaining the combustion chamber thereof at a predetermined elevated temperature so that organic compounds having high molecular weights can be readily detected thereby and will not condense therein.

Still another object of the invention is to provide an improved sampling system and method for supplying a controlled amount of a gas under a predetermined pressure and predetermined rate of flow; more specifically, it is an object to provide such a system wherein the gas is sampled under subatmospheric conditions.

Yet another object of the invention is to provide an improved sampling system of the type set forth which quickly reaches equilibrium and therefore renders possible continuous sampling of gases.

A further object of the invention is to provide an improved sampling system of the type set forth that is particularly useful in the sampling of gases or aerosols containing very small particles having a particle size of less than about 10 microns in diameter and at a very steady rate in minute volumes of the order of one to five cubic centimeters per minute.

Further features of the invention pertain to the particular arrangement and construction of the apparatus and system whereby the above-outlined and additional operating features thereof are attained.

Figure 2:
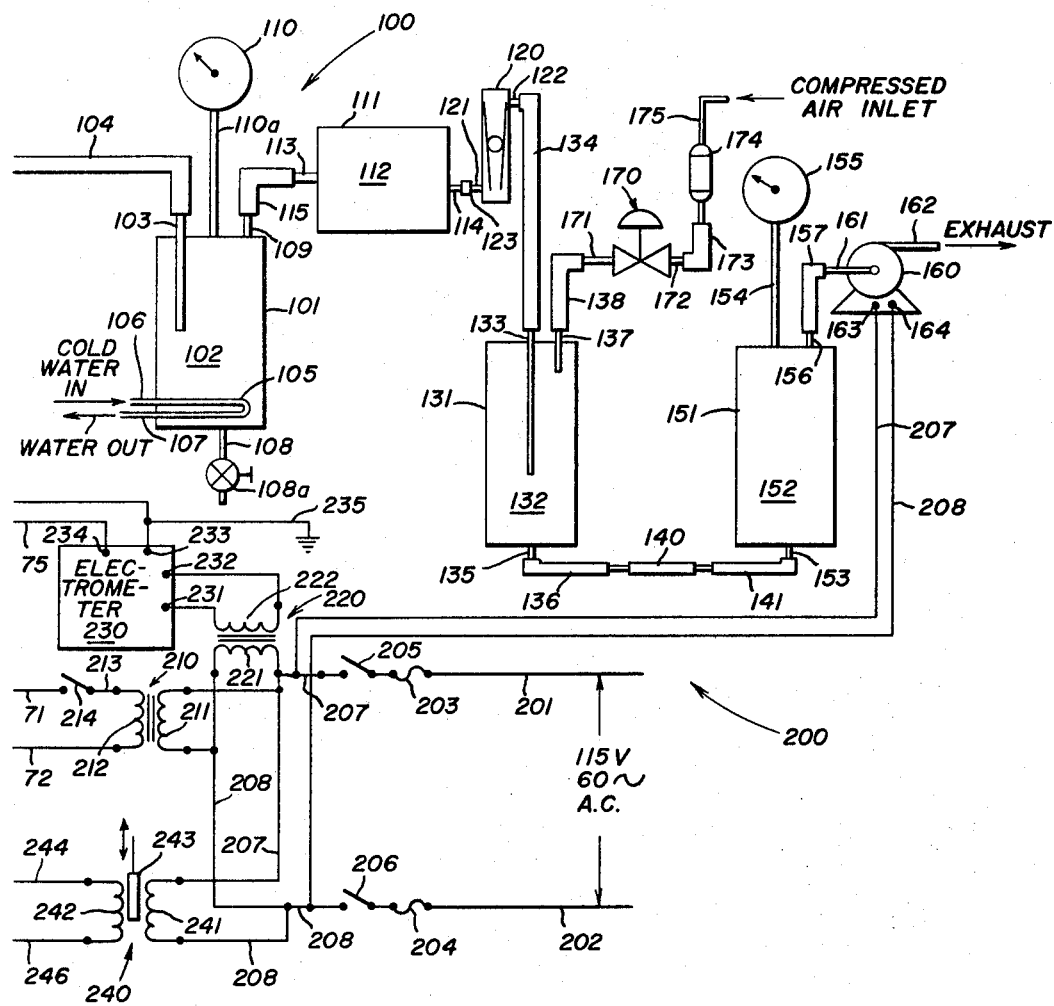

The invention, both as to its organization and method of operation, together with further objects and advantages thereof, will best be understood by reference to the following specification when taken in connection with the accompanying drawing, in which:

FIGURES 1 and 2 taken together constitute a schematic and diagrammatic representation of an ionization detector system made in accordance with and embodying the principles of the present invention, and incorporating therein the improved hydrogen flame ionization detector and the improved sampling system of the present invention, the detector being illustrated in vertical section.

Referring to FIGS. 1 and 2 of the drawing, there is shown an ionization detector system generally designated by the numeral 10 and made in accordance and embodying therein the principles of the present invention, the system 10 including generally an hydrogen flame ionization detector 20, a gas sampling system 100 and an electrical system 200. The hydrogen flame ionization detector 20 comprises an outer casing 22 that is generally cylindrical in shape and is arranged in a general upstanding position, the casing 22 being shown in vertical section in FIG. 1 and preferably being formed of type 316 stainless steel. The lower end of the casing 22 is closed by a circular plate 24 which is suitably secured thereto such as by welding at 26.

Disposed within the casing 22 and spaced inwardly therefrom is an upstanding cylindrical housing 30 which has a length slightly less than that of the casing 22 and a diameter less than that of the casing 22 so as to fit therewithin, the housing 30 being preferably formed of type 316 stainless steel and defining a combustion chamber generally designated by the numeral 32. Integral with the lower end of the housing 30 is an inturned bottom wall 34 which has an opening generally centrally thereof to receive therethrough the upper end of an hydrogen flame ionization burner generally designated by the numeral 40. The burner 40 includes a metal body 41 which is secured to the bottom wall 34 such as by soldering at 36 with silver solder to provide good thermal contact between the burner body 41 and the bottom wall 34 of the housing 30. Mounted on the top of the body 41 is a burner tip 42 which is electrically insulated therefrom and provided with a gas passage therein communicating with a substantially vertically arranged gas passage 43 within the body 41. There further is provided in the body 41 a first lateral passage 44 for connection to a source of hydrogen gas and a second lateral passage 45 for connection to a source of the gas to be sampled and analyzed, the lateral passages 44 and 45 connecting with each other within the body 41 and in turn connecting with the vertical passage 43 therein. Yet another passage 46 is provided in the body 41 and is adapted to be connected to a source of oxygen containing gas, such as air, to support combustion of the hydrogen gas introduced through the passage 44, the passage 46 emerging int othe chamber 32 at a point spaced from the burner jet 42. The mixture of hydrogen gas and oxygen containing gas within the chamber 32 when ignited burns to produce an ionizing flame designated by the numeral 47, the burner jet 42 being formed of a good heat conducting metal and being placed in good thermal contact with but electrically insulated from the body 41 which is in turn in good thermal contact with the housing 30 so that the burner jet 42 is maintained at a temperature sufficiently low so that there is substantially no thermal electron emission therefrom.

The upper end of the housing 30 is closed by a heat resistant cover 50 which is generally circular in shape and has an external diameter greater than the external diameter of the housing 30 and less than the internal diameter of the casing 22. Preferably the cover 50 is formed of a synthetic organic resin having good stability at high temperatures, a suitable material of construction being tetrafluoroethylene polymers, which material is not only heat resistant but in addition has good heat insulating properties and good electrical insulating properties. The underside of the cover 50 has an annular slot 51 therein disposed concentrically therewith and receiving the upper edge of the housing 30 thereinto so as to close and seal the upper end of the housing 30. Structure is provided removably to mount the cover 50 upon the upper end of the housing 30 and to this end an annular bracket 52 is provided having a cylindrical flange 53 surrounding the outer surface of the housing 50 adjacent to the upper end thereof and suitably secured thereto such as by welding along the line 54; the upper edge of the cylindrical flange 53 has an outwardly extending annular flange 55 extending therearound, the flange 55 having a circular periphery that has a diameter slightly less than the internal diameter of the casing 22 so as to fit therein. A plurality of threaded openings 56 is provided about the flange 55 for receiving therein threaded shanks 57, the upper ends of the shanks 57 being provided with heads 58 that bear against and hold in position an annular ring 59 resting upon the upper surface of the cover 50. The outer periphery of the ring 59 is circular in shape and has a diameter slightly less than the internal diameter of the casing 22 so as to be freely movable vertically with respect thereto; the ring 59 extends inwardly to overlie the outer portions of the upper surface of the cover 50 inwardly of the annular slot 51 and is provided with a circular opening 59a centrally thereof.

There further is provided in the ring 59 a plurality of circular openings 59b corresponding in number to the threaded openings 56 in the flange 55 for receiving the threaded shanks 57 therethrough; the preferred material of construction of the ring 59 is stainless steel. By threading the shanks 57 downwardly into the threaded openings 56 in the flange 55, the heads 58 are moved downwardly against the upper surface of the ring 59 which in turn bears downwardly on the upper surface of the cover 50 to press the cover 50 into closing and sealing relationship with the upper end of the housing 30 so as effectively to close and seal the upper end of the combustion chamber 32.

Suitable piping structure is provided to carry hydrogen gas, oxygen containing gas, and a gas containing the sample to be analyzed into the burner 40 and to withdraw the resultant gas mixture from the combustion chamber 32. To this end a first capillary tube 60 is provided which extends through the outer casing 22 and beneath the lower housing wall 34 and connects with the passage 45 in the burner body 41 so as to introduce a gas sample thereinto, the capillary tube 60, for example, having an internal diameter of 0.020″ and a length of 6 inches and connecting with a supply pipe (not shown) having an internal diameter of the order of an inch. Another capillary tube 61 is provided which connects with the passage 44 in the burner body 41 and extends outwardly therefrom to a point spaced inwardly from the inner surface of the casing 22 and then upwardly through the flange 55 and through the ring 59 for connection to a source of hydrogen gas under pressure, the capillary tube 61, for example, having an internal diameter of 0.006″ and a length of 24 inches and connecting with a supply pipe (not shown) having an internal diameter of the order of ¼″. There further is provided another capillary tube 62 which connects at one end thereof with the passage 46 in the burner body 41 and extends outwardly therefrom and then upwardly through a hole in the flange 55 and through a hole in the ring 59 for connection to a source of gas (not shown) containing oxygen to provide oxygen for the burning of the hydrogen in the flame 47, the capillary tube 62, for example, having an internal diameter of 0.10″ and a length of 24 inches and connecting with a supply pipe (not shown) having an internal diameter of the order of ¼″. Finally, an outlet is provided for the chamber 32 in the form of a pipe 63 having a threaded lower end as at 64 for engaging in a threaded opening disposed centrally of the cover 50 and having a threaded outer end 65 for connection to the sampling system 100 as will be described more fully hereinafter, the internal diameter of the pipe 63 being, for example, ½″.

There further is provided within the combustion chamber 32 an igniter wire 70 which is preferably formed of platinum and is connected to and supported by a pair of conductors 71 and 72 which extend upwardly through the combustion chamber 32 and outwardly through suitable openings in the cover 50 for connection to the electrical system 200 as will be explained more fully hereinafter. Means also is provided within the combustion chamber 32 to detect the ionization of the gases within the flame 47 and including a first annular electrode 74 and a second annular electrode 76. The first electrode 74 is disposed about the base of the flame 47 and supported by the burner tip 42 and mechanically mounted thereon, an electrical connection to the electrode 74 being made by a conductor 75 which extends upwardly through the chamber 32 and out through an opening in the cover 50 for connection to the electrical system 200 as will be described more fully hereinafter. The second electrode 76 is in the form of an annular and cylindrical screen which is preferably formed of stainless steel and gold plated to provide an 84-mesh screen which is spaced slightly above the upper end of the flame 47 and disposed concentrically with respect thereto, the vertical extent of the annular screen 76 being substantial and on the order of about two inches. The annular screen electrode 76 is supported by and electrically connected to a rod 77 which extends upwardly through the combustion chamber 32 and through a hole in the cover 50 for connection to the electrical system 200, as will be explained more fully hereinafter.

It is to be understood that the holes in the cover 50 that receive the conductors 71, 72, 75 and 77 therethrough form a gas-tight connection therearound and the material of the cover 50 electrically insulates the conductors one from another.

When the hydrogen flame ionization detector 20 is used to measure the concentration of organic materials in the inlet pipe 60 wherein the organic materials have a high molecular weight, it is necessary to maintain the combustion chamber 32 at an elevated temperature so as to minimize the condensation and accumulation of the organic material being measured therein. Maintaining the temperature of the combustion chamber 32 substantially constant throughout also minimizes the noise signal generated in the flame 47 and thereby increases the sensitivity of the detector and the system. Accordingly, in order to maintain the temperature within the combustion chamber 32 at a relatively high value, and further to maintain the temperature substantially constant throughout the combustion chamber 32, a quantity of insulating material 80 has been provided between the inner surface of the casing 22 and the outer surface of the housing 30 and below the outwardly extending flange 55 thereon. The insulating material 80 may be of any suitable character but preferably is formed of glass fibers disposed between the casing 22 and the housing 30 and substantially filling the space therebetween. Heating structure independent of the burner 40 is also provided to heat the combustion chamber 32 if necessary, the heating structure being an electric heater 81 disposed about the outer surface of the housing 30 substantially midway between the upper and lower ends thereof and being in the form of a tape heater wrapped around the outer surface of the housing 30 and provided with a pair of electrical connections 82 and 83 suitably connected to the electrical system 200, as will be described more fully hereinafter. There further is provided on the exterior of the housing 30 a thermostat 84 in thermal contact with the housing 30 to sense the temperature thereof and having a pair of output terminals 85 and 86 suitably connected in the electrical circuit 200.

In accordance with the present invention the improved sampling system 100 is provided in the ionization detector system 10 to supply an accurately controlled amount of sample gas through the capillary tube 60 and into the detector 20, the sample gas being accurately controlled as the pressure under which it is admitted and consequently the flow rate thereof. The sampling system 100 also accurately controls the flow of hydrogen gas and the oxygen containing gas into the combustion chamber 32 so as to minimize fluctuations in the flame 47 and thus to reduce the background noise in the system and to increase the sensitivity thereof. The outlet pipe 63 from the combustion chamber 32 is connected directly to the inlet to the sampling system 100 and all of the gases passing through the combustion chamber 32 are withdrawn into the sampling system 100 so as to maintain the pressure within the combustion chamber 32 at a predetermined pressure below atmospheric pressure, such as for example, at a pressure corresponding to 6 inches of water below atmospheric pressure, or any other desired value between a fraction of an inch up to 18 inches of water or more below atmospheric pressure.

The sampling system 100 of FIG. 2 includes a first housing or tank 101 defining a first chamber 102 which is closed and has a volume several times the volume of the combustion chamber 32, for example, the chamber 102 having a volume of 3,000 cc. when the combustion chamber 32 has a volume of 400 cc. An inlet pipe 103 having a substantial internal diameter on the order of ½" is provided for the housing 102; the pipe 103 extends a substantial distance downwardly into the housing 102 and is connected by piping 104 to the outlet pipe 63 for the combustion chamber 32, the piping 104 being preferably formed of a synthetic organic plastic in the form of a tube having an internal diameter of ⅜", the preferred material of construction being tetrafluoroethylene polymers, whereby the first chamber 102 is directly connected to and in communication with the combustion chamber 32 via the outlet pipe 63, the piping 104 and the inlet pipe 103. Disposed within the first chamber 102 is a coil 105 which is adapted to receive cold water in one end thereof as at 106 so as to cool the coil 105 and connected at the outlet end 107 thereof to a drain or other suitable point of disposal of the cooling water issuing therefrom. The coil 105 is preferably supplied with tap water having a temperature in the range 60° F. to 75° F. and, accordingly, is capable of condensing water vapor and other like gases which enter the first chamber 102 from the combustion chamber 32, whereby to remove such condensable gases from the gas stream flowing thereinto so as to eliminate the clogging of subsequent components of the sampling system by condensed gases and to relieve the load on succeeding stages of the gas sampling system. An outlet drain 108 provided with a suitable control valve 108a is connected in the bottom of the chamber 102 for withdrawing the condensed water and other liquids from the chamber 102. The remaining gases not condensed within the chamber 102 are withdrawn therefrom through an outlet 109 disposed in the upper end of the chamber 102.

There further is provided a pressure indicating gauge 110 having a connection 110a communicating with the upper end of the chamber 102, the gauge 110 being capable of measuring subatmospheric pressures from a fraction of an inch of water up to eighteen inches of water or more; more specifically, the gauge 110 is preferably of the magnehelic vacuum gauge type which has the dial thereof directly calibrated in inches of water, the gauge 110 indirectly indicating the vacuum within the combustion chamber 32 since the outlet pipe 63 and the inlet pipe 103 have substantial diameters on the order of ⅜" and ½" and the piping 104 has an internal diameter of ⅜", whereby the pressure within the combustion chamber 32 is the same as that within the chamber 102.

The first chamber 102 is directly connected to a housing 111 defining a second chamber 112 and having an inlet 113 and an outlet 114, the inlet 113 being connected directly by the piping 115 to the outlet 109 for the first chamber 102, the inlet 113 and the piping 115 having substantial internal diameters on the order of ¼" or greater. The second chamber 112 serves as an isolation or ballast tank to absorb or dampen variations in pressure between the components disposed on either side thereof in the sampling system 100 and preferably has a volume of substantially the same order of magnitude as the first chamber 102, so as to maintain the pressure within the chambers 32 and 102 substantially constant and free of fluctuations of the pressure therein, the chamber 112 having a volume of, for example, 3,000 cc. when the combustion chamber has a volume of 400 cc.

The rate of flow of the gases issuing from the chamber 112 is measured by a flow meter 120 having an inlet connection 121 and an outlet connection 122, the inlet connection 121 being connected by the piping 123 to the outlet 114 of the chamber 112 so that all of the gases passing through the chamber 112 pass through the meter 120, whereby the rate of flow thereof can be measured.

The gases issuing from the flow meter 120 through the outlet connection 122 therefrom are conducted into a housing 131 defining a chamber 132, the chamber 132 having a volume of the same order of magnitude as the chambers 102 and 112, i.e., about 3,000 cc. when the combustion chamber 32 has a volume of 400 cc. The interior of the chamber 132 is maintained at a subatmospheric pressure substantially less than that in the combustion chamber 32 and the chamber 102 and will be in the range from a few inches of water to about 30 inches of water below atmospheric pressure. An inlet pipe 133 is provided communicating with the chamber 132 and extending downwardly to a point spaced a short distance from the bottom thereof and connected at the upper end by the piping 134 to the outlet connection 122 to the flow meter 120. An outlet 135 is provided for the chamber 132 to withdraw all of the gases therein therefrom, the outlet 135 being connected by the piping 136 to a capillary tube 140, the capillary tube 140 preferably having an internal diameter of the order of 0.010 inch and a length of about 4 inches.

The outlet of the capillary tube 140 is connected by the piping 141 to a housing 151 defining therein a high vacuum chamber 152, the chamber 152 being provided at the bottom thereof with an inlet 153 connected to the piping 141. The volume of the chamber 152 is of the same order of magnitude as the volume of the chambers 102, 112 and 132, i.e., about 3,000 cc. when the combustion chamber 32 has a volume of 400 cc., and the pressure within the chamber 152 is preferably maintained at a value substantially below that of the low vacuum chamber 132, the pressure within the chamber 152 corresponding to a vacuum in the range from about 100 mm. to about 200 mm. of mercury. The upper end of the chamber 152 is connected by the piping 154 to a vacuum gauge 155 which indicates the pressure or vacuum within the chamber 152; there further is provided in the upper end of the chamber 152 an outlet 156 which is connected by the piping 157 to a high capacity vacuum pump generally designated by the numeral 160. The pump 160 more particularly includes a gas intake 161 connected to the piping 157 and a gas exhaust 162, the pump 160 being preferably operated by an electrical motor having electrical power input connections 163 and 164 that are suitably connected to the electrical system 200 as will be described more fully hereinafter.

The low vacuum chamber 132 has a second input 137 in the upper end thereof which is connected by the piping 138 to a precision vacuum regulator 170, the regulator 170 being, for example, of the type commercially available from Moore Products Co., Model No. 44; more specifically, the regulator 170 includes an outlet 171 connected to the piping 138 and the inlet 172 connected to a source of compressed air (not shown) via piping 173, an air filter 174 and piping 175. The valve 170 is of the type which is adapted to pass compressed air therethrough from the inlet 172 to the outlet 171 upon demand to maintain a predetermined pressure in the output 171, thus to maintain the pressure within the chamber 132 at the predetermined pressure set by the regulator 170, the regulator 170 reducing or stopping the passage of air therethrough when the pressure within the chamber 132 and within the outlet 171 approach or exceed that set by the regulator 170 and passing more air therethrough when the pressure within the chamber 132 and consequently the outlet 171 falls below the predetermined pressure as set by the regulator 170.

Electrical power for operating and controlling the ionization detector system 10 and particularly the electrical system 200 therefor is derived from a pair of input conductors 201 and 202 to which is applied a 115 volt, 60 cycle, A.C. source. Fuses 203 and 204 and main line switches 205 and 206 are provided connecting to conductors 207 and 208 respectively. The conductors 207 and 208 are connected directly to the power terminals 163 and 164 of the motor for the vacuum pump 160 so as to provide motive power for the vacuum pump 160 immediately upon closure of the main line switches 205 and 206. The conductors 207 and 208 are also connected as the input to a first transformer 210 including a primary winding 211 across which the conductors 207 and 208 are connected and a secondary winding 212. One terminal of the secondary winding 212 is connected by a conductor 213 to one terminal of a start switch 214, the other terminal of the start switch 214 being connected to the igniter wire conductor 71. The other terminal of the secondary winding 212 is connected to the other igniter wire conductor 72; whereby the primary winding 212 is effective to provide the necessary voltage, for example, 2.5 volts A.C., to energize the igniter wire 70 upon closure of the start switch 214 so as to cause the igniter wire 70 to be heated to a temperature such that it can ignite a mixture of hydrogen gas and oxygen gas flowing thereacross.

The conductors 207 and 208 are further connected to the input terminals of a transformer 220, and more specifically, to the input terminals for the primary winding 221 thereof, the transformer 220 further having a secondary winding 222 across which is developed a relatively high voltage which is applied as the input to an electrometer 230 and more specifically to the input terminals 231 and 232 thereof. An electrical output is derived from a high voltage battery within the electrometer 230 on output terminals 233 and 234 thereof; the output terminal 233 is grounded through the conductor 235 and further is connected by the conductor 235 to the rod 77 that is in electrical contact with the collector screen 76 so as to maintain the collector screen 76 at substantially ground potential; the other output terminal 234 provides a negative 300 volt D.C. potential from the battery heretofore mentioned which is connected to the conductor 75 so as to apply a high negative potential of 300 volts D.C. to the ring electrode 74. The electrometer 230 may be, for example, that sold by Research Specialties Co., Model 605-3 electrometer, which can detect very small current flows between the ring electrode 74 and the collector screen 76 caused by the ionization gases and other materials passing through the hydrogen flame 47, the electrometer 230 being capable of detecting currents on the order of $10^{-14}$ ampere, the response time of electrometer 230 being a fraction of a second.

The conductors 207 and 208 are further connected to yet another transformer 240 which includes a primary winding 241 and a secondary winding 242, the conductors 207 and 208 being more particularly connected to the input terminals of the primary winding 241; a movable core 243 is provided for the transformer 240 so as to vary the coupling between the primary winding 241 and the secondary winding 242 so as to vary the potential developed across the output terminals of the secondary winding 242. The first output terminal of the secondary winding 242 is connected by a conductor 244 to the terminal 83 of the electrical heater 81, the other terminal 82 of the heater 81 being connected by a conductor 245 to the terminal 86 of the thermostat 84; the other terminal 85 of the thermostat 84 is connected by a conductor 246 to the other terminal of the secondary winding 242; whereby the potential developed in the secondary winding 242 is connected across the heater 81 and the thermostat 84 in series with each other. The amount of current supplied to the heater 81 is controlled both by the position of the core 243 in the transformer 240 and the operation of the thermostat 84, the position of the core 243 being manually adjustable so as approximately to set the temperature of operation of the heater 81 and the thermostat 84 being automatically operable to make and to interrupt the electrical circuit for the heater 81 so as to control closely the temperature of the housing 30 heated by the heater 81.

The hydrogen flame ionization detector 20 is further completely enclosed within an electrostatic shield diagrammatically represented at 250 which is grounded by connection to the conductor 235, the shield 250 being formed of a highly conductive material such as aluminum metal so as to shield the detector 20, and particularly the electrical components thereof, from extraneous electrical fields so that there will be no interference with the detection of the very minute electrical currents that are present and which are to be detected between the electrodes 74 and 76. It further will be understood that the various conductors and particularly the conductors 75 and 235 interconnecting the detector 20 and the electrometer 230 are also shielded so as to prevent pick up thereby of currents from stray fields existing in the vicinity thereof.

A detailed description of the operation of the ionization detector system 10 will now be given, the use of the system 10 to detect small concentrations of a high molecular weight organic material in an air stream being given for purposes of illustration; more specifically, the detector system 10 will be described as applied to the detection and measurement of the presence in aerosol form of phenoltetrabromophthalein sulfonate disodium (hereinafter referred to as BSP) having the empirical formula $C_{20}H_8Br_4O_{10}S_2Na_2$ and a molecular weight of about 838, the BSP being present in a concentration within the range from about one to about 200 micrograms per liter of air, or, for example, approximately 80 micrograms per liter of air, the air carrying the BSP aerosol being admitted from a supply pipe (not shown) through the capillary tube 60 to the detector 20. It also is to be understood that inorganic finely divided particulates such as sodium chloride can be detected by this system. The hydrogen gas utilized in the detector 20 is preferably of chromatographic grade and contains no hydrocarbons, the hydrogen being supplied from a pipe (not shown) and through the capillary tube 61 to the detector 20. Air, preferably of the "waterpumped" type which contains no traces of hydrocarbons is provided from a supply pipe (not shown) and admitted through the capillary tube 62 into the detector 20. Filters (not shown) are provided in both the tubes 61 and 62 to filter all particulates therefrom. The cooling coil 105 is connected to a suitable source of ordinary cold tap water and ordinary compressed air is connected, to the air inlet 175 in the sampling system 100, it not being necessary to insure that this stream of air is free of all traces of hydrocarbons. Best results are obtained when the hydrogen gas in the supply pipe therefor connected to the capillary tube 61 is at a pressure of 5 lbs. per square inch and the air in the supply pipe for the aerosol in air sample connected to the capillary tube 60 is substantially at atmospheric pressure, the diameters and lengths of the capillary tubes 60, 61 and 62 being adjusted to obtain the desired flow rates at the same applied pressure within the combustion chamber 32.

To begin operation of the hydrogen flame ionization detector 20, the various gas and water connections are made as described above and the switches 205 and 206 are then closed. This immediately begins operation of the vacuum pump 160 to draw air from the combustion chamber 32 through the various chambers 102, 112, 132 and 152 and out the pump exhaust 162. The pressure within the system will quickly drop below atmospheric pressure; accordingly, hydrogen gas will be drawn into the combustion chamber 32 as will air to provide a suitable mixture, which when ignited, will result in the flame 47. In order to ignite the hydrogen-air mixture, the start switch 214 is momentarily closed to heat the igniter wire 70, a circuit being traced from the conductors 207–208 through the transformer 210, the start switch 214 and the conductors 71 and 72 to the ends of the igniter wire 70. The igniter wire 70 rapidly reaches a temperature such that it ignites the hydrogen-mixture to establish the flame 47, the switch 214 being opened as soon as the flame 47 has been established.

It further will be noted the heater 81 will be operating at this time, the heater 81 being energized from the conductors 207–208 through the transformer 240, the conductor 244, the thermostat 84 (which is now closed since the housing 30 will be cold) and the conductor 246.

If no sample is admitted into the hydrogen flame 47 via the capillary tube 60, there will be sufficient ionization within the hydrogen flame 47 to cause a current to flow between the electrodes 74 and 76 having a magnitude on the order of about $10^{-12}$ ampere, which current represents background noise, the resistance of the hydrogen flame being on the order of $10^{14}$ ohms. The background noise is maintained at a minimum value if the pressure of the hydrogen gas entering the burner 40 and the combustion chamber 42 is maintained constant, any fluctuations of the pressure or the rate of feed of hydrogen gas thereinto creating substantial background noise and therefore diminishing the sensitivity of the detector.

If an organic or particulate material is now introduced into the hydrogen flame 47, the ionization created thereby is substantially increased to cause a corresponding increase in the current flow between the electrodes 74 and 76, this increase in current flow being detected by the electrometer 230. The manner in which even very minute traces of organic materials substantially increase the ionization within the flame 47 is not fully understood, but it is believed that the organic compounds have smaller ionization potentials than the inorganic gases present in the flame 47 and further that particles of carbon formed in the flame have a small work function and thus supply a large number of electrons to the flame to permit substantial ionization thereby with a resultant substantial flow of current between the electrodes 74 and 76. In any event, the introduction of even small amounts of organic materials, such as 80 micrograms of BSP per liter of air can be detected and even smaller amounts can be detected on the order of one microgram and less of BSP per liter of air. The increase in current flow between the electrodes 74 and 76 can be calibrated to measure the concentration of the organic material introduced into the chamber 32 through the capillary tube 60.

Best results are obtained in the operation of the hydrogen flame ionization detector 20 when the pressure therein is very carefully controlled, and it has been found in accordance with the present invention that the pressure therein can be more readily controlled if the detector 20 is operated under a slight vacuum, i.e., under a subatmospheric pressure corresponding to a differential with respect to atmospheric pressure of a few inches of water, for example, up to about six inches of water or even more. When the detector 20 is operated under such subatmospheric conditions, the rate of flow of all of the gases thereinto and particularly the rate of flow of the hydrogen gas thereinto is carefully controlled and occurs with no fluctuations, thereby to minimize the background or noise signals generated in the hydrogen flame 47, the major source of noise being variations in the flow of hydrogen gas to the combustion area of the flame 47. Such a careful control of the pressure within the combustion chamber 32 also carefully controls the introduction of the gas to be sampled thereinto through the capillary tube 60 so that accurate amounts of the sample gas or aerosol are admitted into the combustion chamber 32.

In addition, when measuring the concentration of high molecular weight organic material such as BSP, it is necessary that there be no condensation or accumulation of these materials within the combustion chamber 32 and to this end the heater 81 has been added so as to maintain the temperatures within the combustion chamber 32 at a substantially constant value so that all of the material added through the sampling capillary tube 60 is withdrawn from the combustion chamber 32 through the outlet pipe 63 therefor. The constant temperature of the combustion chamber 32 also aids in maintaining the constant pressure therein, there being a minimum of fluctuation of pressure due to temperature changes within the combustion chamber 32.

The primary method of maintaining the pressure within the combustion chamber 32 at a constant non-fluctuating and predetermined value with the resultant constant introduction of hydrogen gas and gas sample thereunto is achieved by use in connection therewith of the improved sampling system 100 of the present invention. The operation of the vacuum pump 160 establishes an area of high vacuum, i.e., relatively low pressure, within the chamber 152, this pressure being on the order of about 100 mm. to about 200 mm. of mercury vacuum, this pressure being continuously indicated by the gauge 155. The high vacuum within the chamber 152 is communicated to the low vacuum chamber 132 through the capillary passage 140, the capillary passage 140 serving as an isolation element between the vacuum chambers 132 and 152 and substantially eliminating fluctuations of pressure in the low vacuum chamber 132 which result from the operation of the vacuum pump 160. In the system 100, the low vacuum chamber 132 is the primary pressure determining component in the system, the pressure within the chamber 132 being continuously and accurately controlled by the regulator 170, the regulator 170 admitting air into the low vacuum chamber 132 as required to maintain the pressure therein at a constant value. Any minor fluctuations of the pressure within the low vacuum chamber 132 are further diminished by the chamber 112 which serves as a ballast tank between the low vacuum chamber 132 and the first chamber 102.

As the combustion gases leave the combustion chamber 32 through the exit pipe 63, they are carried under the urging of the reduced pressure in the later stages of the system 100 with substantially no pressure drop through the piping 104 and the inlet 103 to the first chamber 102, the gases being directed upon the cooling coil 105 to condense the water vapor and any other condensable vapors therefrom to relieve the load on subsequent stages and particularly the pumping load on the vacuum pump 160, and to prevent clogging thereby of subsequent stages and particularly the flowmeter 120 and the capillary tube 140. Any minor fluctuations in the pressure within the combustion chamber 32 tend to be counteracted by the chamber 102 and further by the connection thereof to the next chamber 112. The accumulated water and other condensable materials in chamber 102 are periodically removed therefrom through the drain pipe 108 and the drain valve 108a; the pressure within the chamber 102 is continuously measured by the gauge 110, the pressure indicated by the gauge 110 being substantially that within both the combustion chamber 32 and the chamber 102 since the connections therebetween are all of large cross section, this pressure preferably being in order of 6″ of water less than atmospheric pressure.

The gases that are not condensed by the cooling coil 105 then pass through the outlet 109 and the piping 115 and into the inlet 113 for the chamber 112, the chamber 112 serving to isolate the chamber 102 from the low vacuum chamber 132. The gases further flow out of the chamber 112 at a steady rate and more particularly through the outlet 114 and through the tube 123 to the inlet of the flowmeter 120 of the inlet 121 of the flowmeter 120, the flowmeter 120 serving continuously to measure the rate of flow of gases through the sampling system. The gases next pass through the outlet 122 and the piping 134 to the inlet 133 of the low vacuum chamber 132, the gases entering the inlet 133 being mixed with the air entering through the inlet 137, the resultant pressure of all of the gases within the chamber 132 being carefully controlled by the regulator 170.

Next the combined gases from the inlets 133 and 137 to the low vacuum chamber 132 exit through the outlet 135 and the piping 136 and into the restricted capillary passage 140 and then through the piping 141 to the inlet 153 for the high vacuum chamber 152. The pressure within the high vacuum chamber 152 is continuously measured by the gauge 155 and is preferably maintained at a value in the range from about 100 mm. to about 200 mm. of mercury vacuum. Finally all of the gases exit through the outlet 156 and the piping 157 to the intake 161 of the vacuum pump 160 and then outwardly through the exhaust 162 thereof to the atmosphere.

The sampling system 100 thus described maintains a highly controlled and constant pressure within the combustion chamber 32 of the detector 20 so as to aid in supplying a constant rate of flow of hydrogen gas to the flame 47 therein, thus to maintain a minimum noise signal, and also to introduce a controlled amount of sample into the detector 20 via the capillary tube 60 so as accurately to control the sample fed thereto. The resultant current flow between the electrode 74 and 76 contains a minimum noise component and accurately reflects the amount of organic material fed to the combustion chamber 32 via the capillary tube 60, the current between the electrode 74 and 76 being detected by the electrometer 230; it is to be understood that the electrometer 230 may be connected to automatic counting and/or recording apparatus (not shown) that will indicate and record a signal proportional to the organic material or to the number of inorganic particulates fed into the combustion chamber 32.

It will be seen that there has been provided an improved ionization detector system and an improved ionization detector and sampling system for use therewith which fulfills all of the objects and advantages set forth above. More particularly a detector and sampling system have been provided which operate at subatmospheric pressure and which provide a more constant supply of hydrogen gas to the flame in the detector and a more constant flow of sample thereto so as to provide a minimum noise signal thus utilizing the maximum sensitivity of the detector and the overall system. Furthermore, heating structure has been provided to maintain the temperature of the combustion chamber at a constant value thus also to assist in maintaining the pressure within the combustion chamber at a constant value and also to prevent the accumulation or condensation of materials, and particularly organic materials, within the combustion chamber. Furthermore, the gas sample to be measured is directly introduced into the combustion chamber and no purge gas need be employed, the system continuously sampling and measuring. Both the detector and the sampling system quickly reach equilibrium and thus make possible the continuous sampling of gases or aerosols containing very small particles having a particle size of less than 10 microns in diameter and in minute volumes in the order of 1 to 5 cubic centimeters per minute and containing only micrograms of organic materials or other solids per liter of carrier gas.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an ionization detector system, the combination comprising a first housing defining a first closed chamber and having a first inlet for introducing a gas sample thereinto and a first outlet for removing gases therefrom, means within said first chamber for ionizing at least a portion of the gas sample introduced thereinto, means for measuring the ionization of the gases within said first chamber, a second housing defining a second closed chamber and having a second inlet connected to said first outlet and a second outlet for removing gases from said second chamber, a source of subatmospheric pressure having a relatively low pressure and connected to said second outlet, a source of gas under a relatively high pressure, a pressure regulator having an inlet therefor connected to said source of gas under pressure and an outlet therefrom and adapted to pass gas from the inlet thereof to the outlet thereof upon demand at a predetermined pressure in said regulator output intermediate said relatively low pressure and said relatively high pressure, and a third inlet for said second chamber connected to said regulator outlet, whereby said regulator maintains the pressure in said second chamber at said predetermined value between said relatively high pressure and said relatively low pressure and thus to maintain a predetermined pressure in said first chamber and a predetermined rate of flow of the gas sample through said first inlet and past said ionizing and measuring means and from said first outlet.

2. In an ionization detector system, the combination comprising a first housing defining a first closed chamber and having a first inlet for introducing a gas sample thereinto and a first outlet for removing gases therefrom, means within said first chamber for ionizing at least a portion of the gas sample introduced thereinto, means for measuring the ionization of the gases within said first chamber, a second housing defining a second closed chamber and having a second inlet connected to said first outlet and a second outlet for removing gases from said second chamber, a third housing defining a third closed chamber and having a third inlet and a third outlet for removing gases from said third chamber, means including a capillary passage interconnecting said second outlet and said third inlet, a source of subatmospheric pressure having a relatively low pressure and connected to said third outlet, a source of gas under a relatively high pressure, a pressure regulator having an inlet therefor connected to said source of gas under pressure and an outlet therefrom and adapted to pass gas from the inlet thereof to the outlet thereof upon demand at a predetermined pressure in said regulator output intermediate said relatively low pressure and said relatively high pressure, and a fourth inlet for said second chamber connected to said regulator outlet, whereby said regulator maintains the pressure in said second chamber at said predetermined value between said relatively high pressure and said relatively low pressure and thus to maintain a predetermined pressure in said first chamber and a predetermined rate of flow of the gas sample through said first inlet and past said ionizing and measuring means and from said first outlet.

3. In an ionization detector system, the combination comprising a first housing defining a first closed chamber and having a first inlet for introducing a gas sample thereinto and a first outlet for removing gases therefrom, a hydrogen flame ionizing unit within said first chamber for ionizing at least a portion of the gas sample introduced thereinto, means for measuring the ionization of the gases within said first chamber, a second housing defining a second closed chamber and having a second inlet connected to said first outlet and a second outlet for removing gases from said second chamber, means within said second chamber for cooling and condensing a portion of the gases passing thereinto, a third housing defining a third closed chamber and having a third inlet connected to said second outlet and a third outlet for removing gases from said third chamber, a source of subatmospheric pressure having a relatively low pressure and connected to said third outlet, a source of gas under a relatively high pressure, a pressure regulator having an inlet therefor connected to said source of gas under pressure and an outlet therefrom and adapted to pass gas from the inlet thereof to the outlet thereof upon demand at a predetermined pressure in said regulator output intermediate said relatively low pressure and said relatively high pressure, and a fourth inlet for said third chamber connected to said regulator outlet, whereby said regulator maintains the pressure in said third chamber at said predetermined value between said relatively high pressure and said relatively low pressure and thus to maintain a predetermined pressure in said first chamber and said second chamber and a predetermined rate of flow of the gas sample through said first inlet and past said hydrogen flame ionizing unit and from said first outlet.

4. In an ionization detector system, the combination comprising a first housing defining a first closed chamber and having a first inlet for introducing a gas sample thereinto and a first outlet for removing gases therefrom, a hydrogen flame ionizing unit within said first chamber for ionizing at least a portion of the gas sample introduced thereinto, means for measuring the ionization of the gases within said first chamber, a second housing defining a second closed chamber and having a second inlet connected to said first outlet and a second outlet for removing gases from said second chamber, means within said second chamber for cooling and condensing a portion of the gases passing thereinto, a third housing defining a third closed chamber and having a third inlet connected to said second outlet and a third outlet for removing gases from said third chamber, means for measuring the rate of flow of gases and having an inlet connected to said third outlet and an outlet therefrom, a fourth housing defining a fourth closed chamber having a fourth inlet connected to said outlet of said flow measuring means and a fourth outlet for removing gases from said fourth chamber, a fifth housing defining a fifth closed chamber and having a fifth inlet thereto and a fifth outlet for removing gases from said fifth chamber, means including a capillary passage interconnecting said fourth outlet and said fifth inlet, a source of subatmospheric pressure having a relatively low pressure and connected to said fifth outlet, a source of gas under a relatively high pressure, a pressure regulator having an inlet therefor connected to said source of gas under pressure and an outlet therefrom and adapted to pass gas from the inlet thereof to the outlet thereof upon demand at a predetermined pressure in said regulator output intermediate said relatively low pressure and said relatively high pressure, and a sixth inlet for said fourth chamber connected to said regulator outlet, whereby said regulator maintains the pressure in said fourth chamber at said predetermined value between said relatively high pressure and said relatively low pressure and thus to maintain a predetermined pressure in said first chamber and in said second chamber and in said third chamber and a predetermined rate of flow of the gas sample through said first inlet and past said hydrogen flame ionizing unit and from said first outlet.

5. In a gas sampling system, the combination comprising a first housing defining a first closed chamber and having a first inlet adapted to communicate with a source of gas to be sampled and a first outlet for removing gases from said first chamber, a second housing defining a second closed chamber and having a second inlet connected to said first outlet and a second outlet for removing gases from said second chamber, a source of subatmospheric pressure having a relatively low pressure and connected to said second outlet, a source of gas under a relatively high pressure, a pressure regulator having an inlet therefore connected to said source of gas under pressure and an outlet therefrom and adapted to pass gas from the inlet thereof to the outlet thereof upon demand at a predetermined pressure in said outlet thereof intermediate said relatively low pressure and said relatively high pressure, and a third inlet for said second chamber connected to said outlet from said regulator, whereby said regulator maintains the pressure in said second chamber at said predetermined value between said relatively high pressure and said relatively low pressure and thus to maintain a predetermined pressure in said first chamber and a predetermined rate of flow of the gas being sampled through said first inlet and into said first chamber.

6. In a gas sampling system, the combination comprising a first housing defining a first closed chamber and having a first inlet adapted to communicate with a source of gas to be sampled and a first outlet for removing gases from said first chamber, a second housing defining a second closed chamber and having a second inlet connected to said first outlet and a second outlet for removing gases from said second chamber, a third housing defining a third closed chamber and having a third inlet and a third outlet for removing gases from said third chamber, means including a capillary passage interconnecting said second outlet and said third inlet, a source of subatmospheric pressure having a relatively low pressure and connected to said third outlet, a source of gas under a relatively high pressure, a pressure regulator having an inlet therefor connected to said source of gas under pressure and an outlet therefrom and adapted to pass gas from the inlet thereof to the outlet thereof upon demand at a predetermined pressure in said outlet thereof intermediate said relatively low pressure and said relatively high pressure, and a third inlet for said second chamber connected to said outlet from said regulator, whereby said regulator maintains the pressure in said second chamber at said predetermined value between said relatively high pressure and said relatively low pressure and thus to maintain a predetermined pressure in said first chamber and a predetermined rate of flow of the gas being sampled through said first inlet and into said first chamber.

7. In a gas sampling system for hydrogen flame ionization detector including a closed combustion chamber having a connection to a source of gas to be sampled and an exhaust connection, the combination comprising a first housing defining a first closed chamber and having a first inlet connected to said exhaust connection and a first outlet for removing gases from said first chamber, means in said first chamber for cooling the gases therein and for condensing certain of the gases therein, a second housing defining a second closed chamber and having a second inlet connected to said first outlet and a second outlet for removing gases from said second chamber, a source of subatmospheric pressure having a relatively low pressure and connected to said second outlet, a source of gas under a relatively high pressure, a pressure regulator having an inlet therefor connected to said source of gas under pressure and an outlet therefrom and adapted to pass gas from the inlet thereof to the outlet thereof upon demand at a predetermined pressure in said outlet thereof intermediate said relatively low pressure and said relatively high pressure, and a third inlet for said second chamber connected to said outlet for said regulator, whereby said regulator maintains the pressure in said second chamber at said predetermined value between said relatively high pressure and said relatively low pressure and thus to maintain a predetermined pressure in said first chamber and in the associated combustion chamber and a predetermined rate of flow of the gas being sampled into said combustion chamber.

8. In a gas sampling system for a hydrogen flame ionization detector including a closed combustion chamber having a connection to a source of gas to be sampled and an exhaust connection, the combination comprising a first housing defining a first closed chamber and having a first inlet connected to said exhaust connection and a first outlet for removing gases from said first chamber, means in said first chamber for cooling the gases therein and for condensing certain of the gases therein, a second housing defining a second closed chamber and having a second inlet connected to said first outlet and a second outlet for removing gases from second chamber, a third housing defining a third closed chamber and having a third inlet connected to said second outlet and a third outlet for removing gases from said third chamber, a fourth housing defining a fourth closed chamber and having a fourth inlet and a fourth outlet for removing gases from said fourth chamber, means including a capillary passage interconnecting said third outlet and said fourth inlet, a source of subatmospheric pressure having a relatively low pressure and connected to said fourth outlet, a source of gas under a relatively high pressure, a pressure regulator having an inlet therefore connected to said source of gas under pressure and an outlet therefrom and adapted to pass gas from the inlet thereof to the outlet thereof upon demand at a predetermined pressure in said outlet thereof intermediate said relatively low pressure and said relatively high pressure, and a fifth inlet for said third chamber connected to said outlet from said regulator, whereby said regulator maintains the pressure in said third chamber at said predetermined value between said relatively high pressure and said relatively low pressure and thus to maintain a predetermined pressure in the associated combustion chamber and said first chamber and said second chamber and a predetermined rate of flow of the gas being sampled into the associated combustion chamber.

9. In an ionization detector system, the combination comprising a housing defining a hermetically closed chamber, a first inlet to said chamber including a first capillary tube for introducing a gas sample thereinto, a hydrogen flame ionizing unit within said chamber for ionizing at least a portion of the gas sample introduced thereinto, said ionizing unit including a second inlet having a second capillary tube therein for supplying hydrogen gas and a third inlet having a third capillary tube therein for supplying an oxygen containing gas to said ionizing unit, means for measuring the ionization of the gases within said chamber, a first outlet from said chamber for removing the gases therefrom, and a source of subatmospheric pressure connected to said first outlet for drawing the gas sample into said chamber through said first capillary tube in said first inlet and past said ionizing unit and said measuring means and for drawing said hydrogen gas through said secondary capillary tube in said second inlet and for drawing said oxygen gas into said third capillary tube in said third inlet to said ionizing unit and from said first outlet, said source of subatmospheric pressure including a second housing defining a second closed chamber and having a fourth inlet connected to said first outlet and a second outlet for removing gases from said second chamber, a source of subatmospheric pressure having a relatively low pressure and connected to said second outlet, a source of gas under relatively high pressure, a pressure regulator having an inlet therefor connected to said source of gas under pressure and an outlet therefrom and adapted to pass gas from the inlet thereof to the outlet thereof upon demand at a predetermined pressure in said regulator output intermediate said relatively low pressure and said relatively high pressure, and a fifth inlet for said second chamber connected to said regulator output, whereby said regulator maintains the pressure in said second chamber at said predetermined value between said relatively high pressure and said relatively low pressure and thus to maintain a predetermined rate of flow of the gases.

10. In an ionization detector system, the combination comprising a housing defining a hermetically closed chamber, a first inlet to said chamber including a first capillary tube for introducing a gas sample thereinto, a hydrogen flame ionizing unit within said chamber for ionizing at least a portion of the gas sample introduced thereinto, said ionizing unit including a second inlet having a second capillary tube therein for supplying hydrogen gas and a third inlet having a third capillary tube therein for supplying an oxygen containing gas to said ionizing unit, means for measuring the ionization of the gases within said chamber, a first outlet from said chamber for removing the gases therefrom, and a source of subatmospheric pressure connected to said first outlet for drawing the gas sample into said chamber through said first capillary tube in said first inlet and past said ionizing unit and said measuring means and for drawing said hydrogen gas through said secondary capillary tube in said second inlet and for drawing said oxygen gas into said third capillary tube in said third inlet to said ionizing unit and from said first outlet, said source of subatmospheric pressure including a second housing defining a second closed chamber and having a fourth inlet connected to said first outlet and a second outlet for removing gases from said second chamber, a third housing defining a third closed chamber and having a fifth inlet and a third outlet for removing gases from said third chamber, means including a capillary passage interconnecting said second outlet and said fifth inlet, a source of subatmospheric pressure having a relatively low pressure and connected to said third outlet, a source of gas under a relatively high pressure, a pressure regulator having an inlet therefor connected to said source of gas under pressure and an outlet therefrom and adapted to pass gas from the inlet thereof to the outlet thereof upon demand at a predetermined pressure in said regulator output intermediate said relatively low pressure and said relatively high pressure, and a sixth inlet for said second chamber connected to said regulator outlet, whereby said regulator maintains the pressure in said second chamber at said predetermined value between said relatively high pressure and said relatively low pressure and thus to maintain a predetermined pressure in said first chamber and a predetermined rate of flow of the gases therein.

11. The ionization detector system set forth in claim 10, and further comprising means within said second chamber for cooling and condensing a portion of the gases passing thereinto.

References Cited

UNITED STATES PATENTS

| | | | |
|---|---|---|---|
| 2,079,601 | 5/1937 | Canfield | 23—255 |
| 2,829,954 | 4/1958 | Dailey et al. | 23—255 |
| 3,076,697 | 2/1963 | Miller et al. | 23—254 |
| 3,086,848 | 4/1963 | Reinecke | 23—254 |
| 3,095,278 | 6/1963 | Green | 23—254 |
| 3,175,886 | 3/1965 | Krzeminski et al. | 23—254 |

JOSEPH SCOVRONEK, *Primary Examiner.*